United States Patent
Yang et al.

(10) Patent No.: US 11,239,655 B2
(45) Date of Patent: Feb. 1, 2022

(54) LIQUID ARC VOLTAGE TRANSFER BASED DIRECT CURRENT BREAKER AND USE METHOD THEREOF

(71) Applicant: XI'AN JIAOTONG UNIVERSITY, Xi'an (CN)

(72) Inventors: Fei Yang, Xi'an (CN); Mingzhe Rong, Xi'an (CN); Yifei Wu, Xi'an (CN); Yi Wu, Xi'an (CN); Chunping Niu, Xi'an (CN)

(73) Assignee: XI'AN JIAOTONG UNIVERSITY, Xi'an (CN)

(*) Notice: Subject to any disclaimer, the term of this patent is extended or adjusted under 35 U.S.C. 154(b) by 47 days.

(21) Appl. No.: 16/712,714

(22) Filed: Dec. 12, 2019

(65) Prior Publication Data

US 2020/0343719 A1    Oct. 29, 2020

(30) Foreign Application Priority Data

Apr. 23, 2019 (CN) .......................... 201910332291.7

(51) Int. Cl.
| | |
|---|---|
| *H02H 9/02* | (2006.01) |
| *H01C 7/12* | (2006.01) |
| *H01H 33/59* | (2006.01) |
| *H01H 33/02* | (2006.01) |
| *H01H 47/00* | (2006.01) |
| *H01H 9/54* | (2006.01) |
| *H02H 3/087* | (2006.01) |

(52) U.S. Cl.
CPC ................. *H02H 9/02* (2013.01); *H01C 7/12* (2013.01); *H01H 9/54* (2013.01); *H01H 9/547* (2013.01); *H01H 33/02* (2013.01); *H01H 33/59* (2013.01); *H01H 47/00* (2013.01); *H02H 3/087* (2013.01)

(58) Field of Classification Search
CPC ............ H02H 9/02; H02H 3/087; H02H 3/00; H02H 3/02; H01C 7/12; H01H 47/00; H01H 33/59; H01H 9/54; H01H 33/596; H01H 9/547
USPC ....................................... 361/2–13
See application file for complete search history.

(56) References Cited

U.S. PATENT DOCUMENTS

| | | | | |
|---|---|---|---|---|
| 4,345,127 | A | * 8/1982 | Niemeyer | H01H 39/006 200/61.08 |
| 5,214,557 | A | * 5/1993 | Hasegawa | H01H 33/596 361/4 |

(Continued)

*Primary Examiner* — Danny Nguyen
(74) *Attorney, Agent, or Firm* — Dragon Sun Law Firm, PC; Jinggao Li, Esq.

(57) ABSTRACT

The disclosure discloses a liquid arc voltage transfer based direct current breaker and a use method thereof. The direct current breaker includes a first connection terminal, a second connection terminal, a main current branch, a transfer branch and an energy dissipation branch. The main current branch is connected between the first connection terminal and the second connection terminal, and the main current branch includes a liquid break. The transfer branch is connected between the first connection terminal and the second connection terminal and is connected in parallel with the main current branch. The energy dissipation branch is connected between the first connection terminal and the second connection terminal and is connected in parallel with the main current branch and the transfer branch.

7 Claims, 10 Drawing Sheets

(56) References Cited

U.S. PATENT DOCUMENTS

| | | | |
|---|---|---|---|
| 8,995,097 B2* | 3/2015 | Skarby | H01H 33/596 |
| | | | 361/2 |
| 9,640,985 B2* | 5/2017 | Xu | H01H 33/596 |
| 2013/0020881 A1* | 1/2013 | Panousis | H01H 33/75 |
| | | | 307/113 |
| 2016/0329179 A1* | 11/2016 | Kim | H01H 9/542 |

* cited by examiner

LIQUID ARC VOLTAGE TRANSFER BASED DIRECT CURRENT BREAKER AND USE METHOD THEREOF

CROSS-REFERENCE TO RELATED APPLICATIONS

This application claims priority to and the benefit of CN 201910332291.7, filed Apr. 23, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure relates to the field of direct current breaker, in particular to a liquid arc voltage transfer based direct current breaker and a use method thereof.

BACKGROUND

With the continuous improvement of power system capacity, direct current transmission and transformation systems and facilities are developing vigorously, and also put forward higher requirements for system stability and security. Among all kinds of faults that may occur in the power system, short-circuit faults are the most harmful to the power grid and have high probability of occurrence. When a short-circuit fault occurs in the power system, the rapidly rising short-circuit current will cause very serious consequences. Therefore, direct current breakers with fault isolation and removal functions are indispensable for the safe and reliable operation of the direct current system. The existing direct current breakers are mainly mechanical and hybrid. However, the traditional mechanical or hybrid direct current breakers use vacuum, SF6 and other gas media as the insulation media of the break, and there are many bottlenecks such as low break arc voltage, poor post-arc medium recovery performance, and a large number of series-connected breaks, which seriously restrict the improvement of the breaking capacity and reliability of the direct current breakers.

The above information disclosed in the background is only used to enhance the understanding of the background of the disclosure, and may therefore contain information that does not constitute the prior art known to those skilled in the field in the country.

Therefore, a heretofore unaddressed need exists in the art to address the aforementioned deficiencies and inadequacies.

SUMMARY

In view of the shortcomings or defects of the prior art, the present disclosure aims to provide a liquid arc voltage transfer based direct current breaker and a use method thereof. By utilizing the obvious physical properties of a liquid medium such as fluidity and heat conduction, the abilities of improving the amplitude of arc voltage during breaking and the post-arc medium insulation recovery ability are much higher than those of gas and vacuum arc, thus contributing to the rapid transfer of current, improving the insulation and voltage withstanding capacity of the breaks, decreasing the number of series-connected breaks, increasing the breaking capacity and reliability, and significantly reducing the cost and volume of the direct current breaker.

Specifically, the present disclosure adopts the following technical scheme:

a liquid arc voltage transfer based direct current breaker, comprising:

a first connection terminal that is configured as an inlet wire of the direct current breaker and a second connection terminal that is configured as an outlet wire of the direct current breaker, a main current branch that is connected between the first connection terminal and the second connection terminal and includes a liquid break, a transfer branch that is connected between the first connection terminal and the second connection terminal and is connected in parallel with the main current branch, and an energy dissipation branch that is connected between the first connection terminal and the second connection terminal and is connected in parallel with the main current branch and the transfer branch, wherein, when current flows through the direct current breaker, the current flows through the main current branch, and the transfer branch is not conducted, and when a short circuit fault occurs in the direct current breaker, the liquid break opens, and the current is transferred to the transfer branch, and finally the current is forcibly transferred to the energy dissipation branch to complete the breaking.

In the direct current breaker, the main current branch includes a liquid break and a vacuum break.

In the direct current breaker, the main current branch includes a series-parallel combination of a liquid break, a vacuum break and a gas break.

In the direct current breaker, the main current branch includes a liquid break and a diode assembly connected in series.

In the direct current breaker, the liquid of the liquid break includes distilled water, transformer oil, vegetable oil, liquid C5F10O, mineral oil or silicone oil.

In the direct current breaker, the transfer branch includes a solid-state switching transfer branch, a pre-charged LC transfer branch, a non-pre-charged LC transfer branch, a bridge LC transfer branch or a magnetically coupled transfer branch.

In the direct current breaker, the direct current breaker is a one-way direct current breaker or a two-way direct current breaker.

In the direct current breaker, the energy dissipation branch includes a metal oxide arrester, a line type metal oxide arrester, a gap-free line type metal oxide arrester, a fully insulated composite coat metal oxide arrester and a combination thereof.

In the direct current breaker, after the current is transferred to the transfer branch, a breaking voltage is set up through a capacitor or a solid-state switch, and the current is forcibly transferred to the energy dissipation branch to complete the breaking.

According to another aspect of the present disclosure, a method of using the direct current breaker includes the following steps:

step 1: when current flows through the Direct current breaker, the current flows through the main current branch, the transfer branch is not conducted, and the transfer capacitor in the transfer branch is pre-charged with a certain voltage;

step 2: when a short circuit fault occurs in the direct current breaker, sending a breaking instruction to a fast switch of the liquid break, and opening moving and static contacts, and when the gap of the moving and static contacts reaches to a certain distance, controlling a thyristor to be conducted, making the pre-charged transfer capacitor discharge by a transfer inductor, and enabling the current of the main current branch to be completely transferred to the transfer branch to open the main current branch; and step 3: reversely charging the transfer capacitor, and when the voltage reaches the conduction voltage of the energy dissipation branch, enabling the energy dissipation branch to be conducted, making the current transferred completely to the energy dissipation branch, and finally enabling the current to drop to zero to realize the direct current breaking.

Beneficial Effects

By designing the main current branch with a liquid break, the circuit breaker can obtain a stronger breaking ability and stronger break insulation strength. By utilizing the obvious physical properties of a liquid medium such as fluidity and heat conduction, the amplitude of arc voltage during breaking and the post-arc medium insulation recovery ability are much higher than those of gas and vacuum arc, which can realize fast current transfer, save auxiliary transfer power electronic devices and pre-charged capacitors, reduce the number of series-connected breaks, and significantly cut down the cost and volume of the direct current breaker while increasing the breaking capacity and reliability.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Referring to the accompanying drawings, the above and other purposes, features and advantages of the present disclosure will be better understood by the following illustrative and non-limiting detailed description of the embodiments of the present disclosure, in which.

Figure 1:
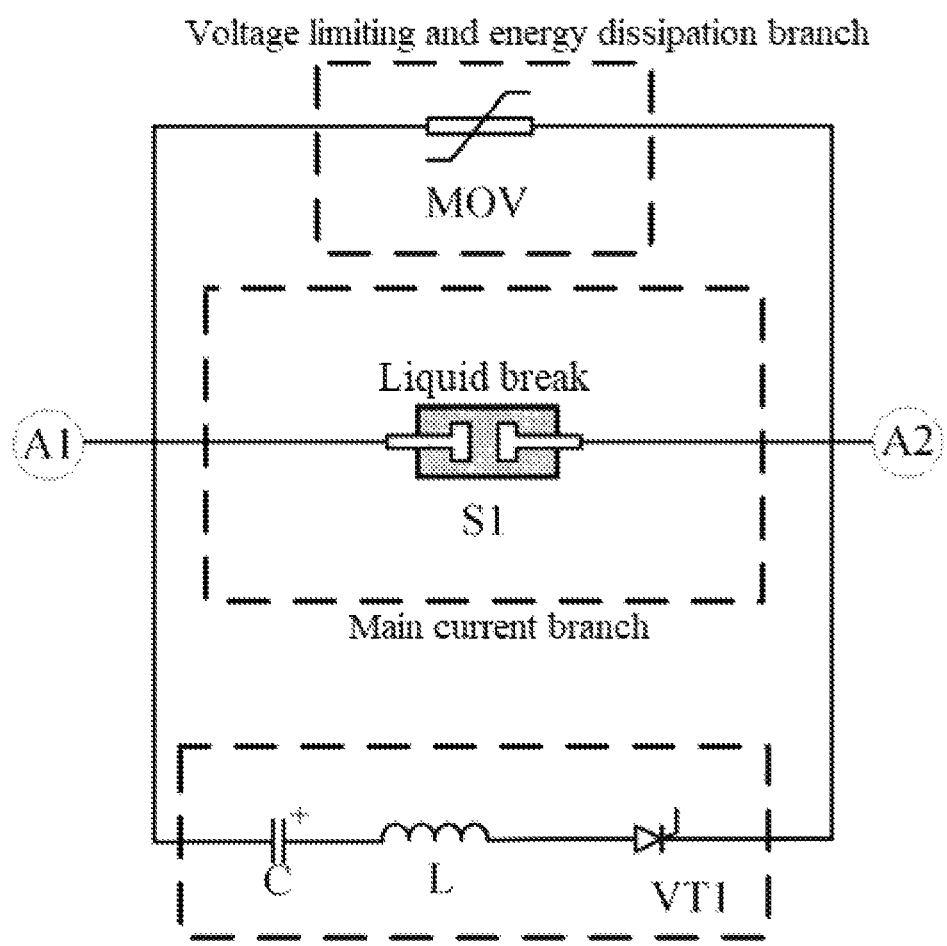
FIG. 1 is a schematic diagram of the mechanical structure of the circuit breaker.
Figure 2A:
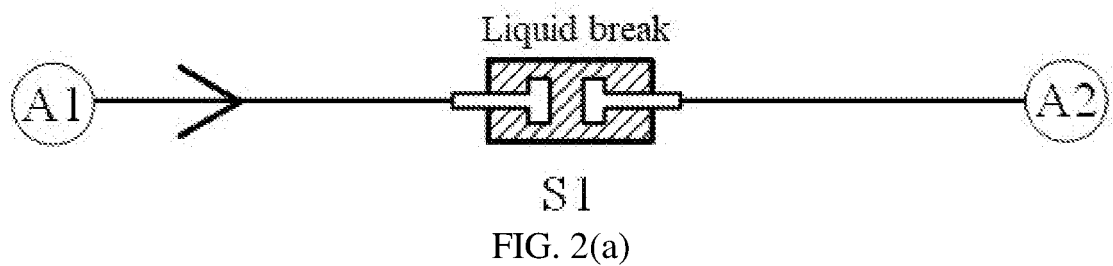
FIG. 2 (a) to FIG. 2 (f) are schematic diagrams of the breaking process of the circuit breaker of the disclosure.
Figure 2B:
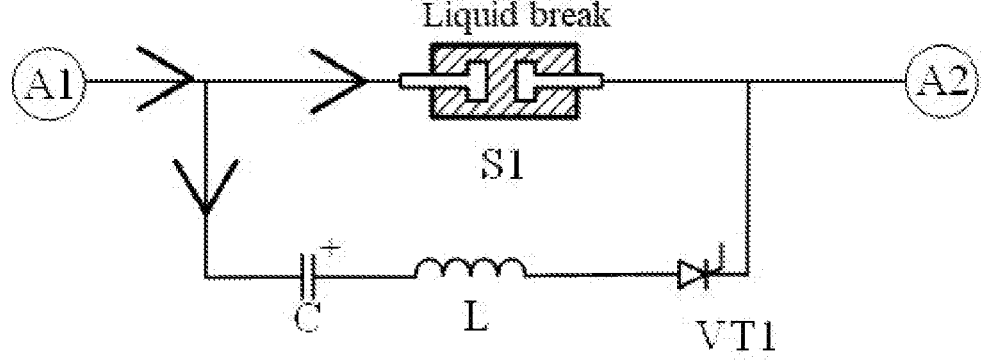
Figure 2C:
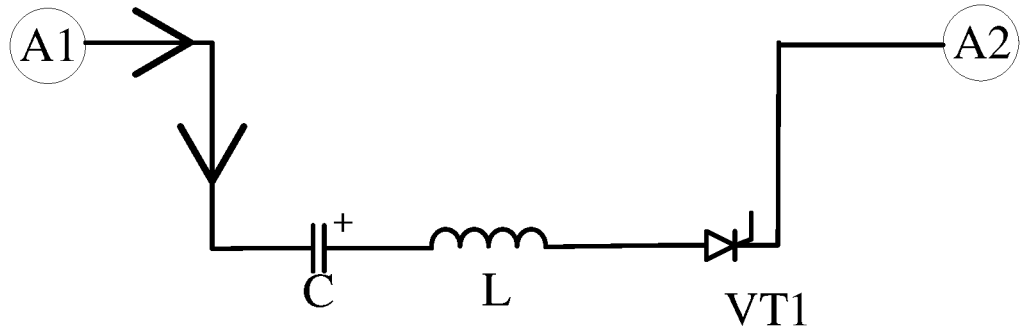
Figure 2D:
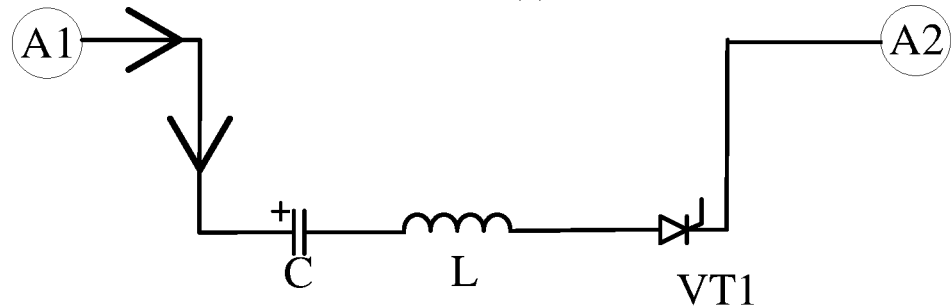
Figure 2E:
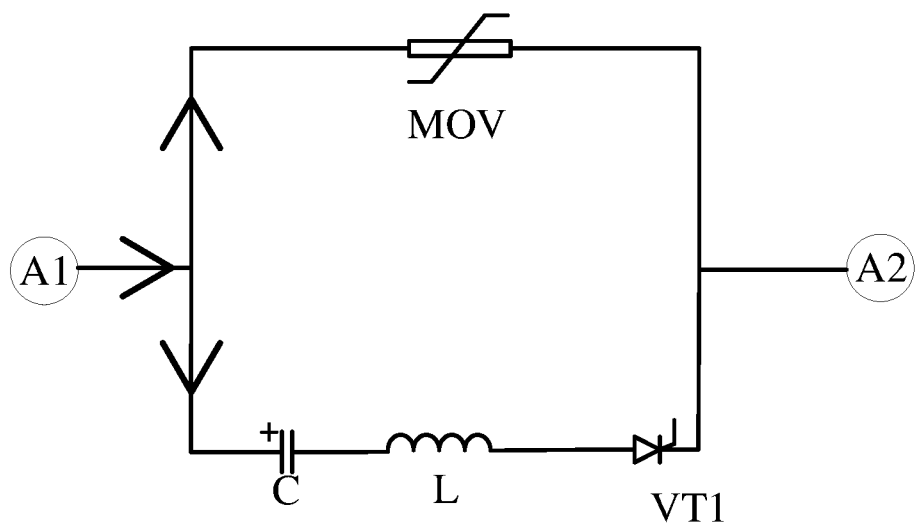
Figure 2F:
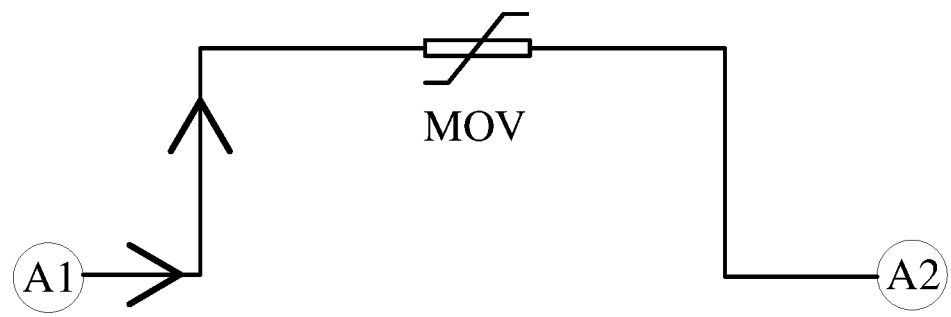

All the drawings are schematic and not necessarily consistent. Further interpretation of the present disclosure is given below in combination with the accompanying drawings and embodiments.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The following detailed description is in fact only illustrative and does not intend to restrict application and use. In addition, it is not intended to be subject to any explicit or implied theoretical constraints presented in the technical field, background, brief overview above or detailed description below. Unless explicitly described to the contrary, the word "include" and its different variations shall be understood as implying the inclusion of the components described, but not excluding any other components.

Specific embodiments of the present disclosure are described below in conjunction with FIGS. 1 to 9.

FIG. 1 is a schematic diagram of the mechanical structure of the circuit breaker. A liquid arc voltage transfer based direct current breaker, comprising:

a first connection terminal that is configured as an inlet wire of the direct current breaker, a second connection terminal that is configured as an outlet wire of the direct current breaker, a main current branch that is connected between the first connection terminal and the second connection terminal and includes a liquid break, a transfer branch that is connected between the first connection terminal and the second connection terminal and is connected in parallel with the main current branch, an energy dissipation branch that is connected between the first connection terminal and the second connection terminal and is connected in parallel with the main current branch and the transfer branch, wherein, when current flows through the direct current breaker, the current flows through the main current branch, and the transfer branch is not conducted, and when a short circuit fault occurs in the direct current breaker, the liquid break opens, and the current is transferred to the transfer branch, and finally the current is forcibly transferred to the energy dissipation branch to complete the breaking.

The present disclosure utilizes the obvious physical properties of a liquid medium such as fluidity and heat conduction so that the amplitude of arc voltage during breaking and the post-arc medium insulation recovery ability are much higher than those of gas and vacuum arc, which can realize fast current transfer, increase the break insulation and voltage withstanding capacity, decrease the number of series-connected breaks, improve breaking capacity and reliability, and significantly reduce the cost and volume of the direct current breaker.

In one embodiment of the direct current breaker, the main current branch includes a liquid break and a vacuum break.

In one embodiment of the direct current breaker, the main current branch includes a series-parallel combination of a liquid break, a vacuum break and a gas break.

In one embodiment of the direct current breaker, the main current branch includes a liquid break and a diode assembly connected in series.

In one embodiment of the direct current breaker, the liquid of the liquid break includes distilled water, transformer oil, vegetable oil, liquid C5F10O, mineral oil or silicone oil.

In one embodiment of the direct current breaker, the transfer branch includes a solid-state switching transfer branch, a pre-charged LC transfer branch, a non-pre-charged LC transfer branch, a bridge LC transfer branch or a magnetically coupled transfer branch.

In one embodiment of the direct current breaker, the direct current breaker is a one-way direct current breaker or a two-way direct current breaker.

In one embodiment of the direct current breaker, the energy dissipation branch includes a metal oxide arrester, a line type metal oxide arrester, a gap-free line type metal oxide arrester, a fully insulated composite coat metal oxide arrester and a combination thereof.

In one embodiment of the direct current breaker, after the current is transferred to the transfer branch, a breaking voltage is set up through a capacitor or a solid-state switch, and the current is forcibly transferred to the energy dissipation branch to complete the breaking.

In order to further understand the present disclosure, in one embodiment, FIG. 1 is a schematic diagram of the mechanical structure of the circuit breaker, including the main current branch, an LC current transfer branch, and a voltage limiting and energy dissipation branch. For this embodiment, see FIG. 1.

Figure 3:
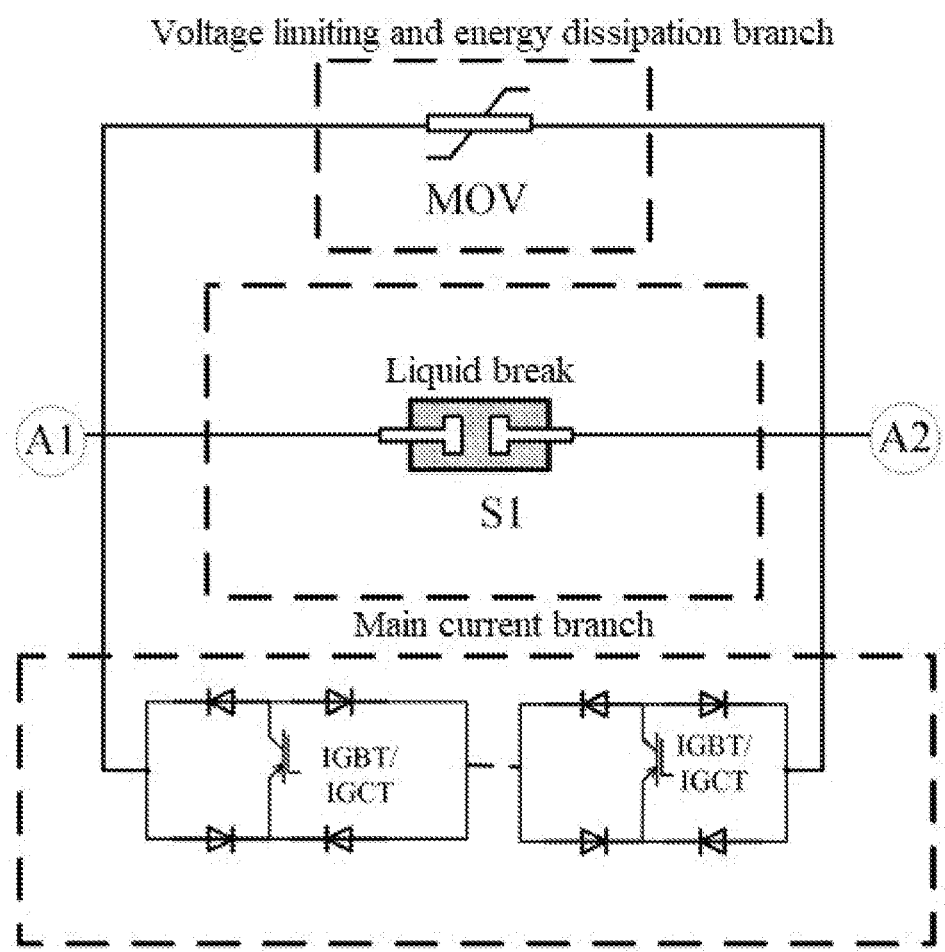
FIG. 3 is a schematic diagram of the liquid break-bridge two-way solid-state switch transfer branch type.

In one embodiment, FIG. 3 is a schematic diagram of the liquid break-bridge two-way solid-state switch transfer branch type. For this embodiment, see FIG. 3.

Figure 4:
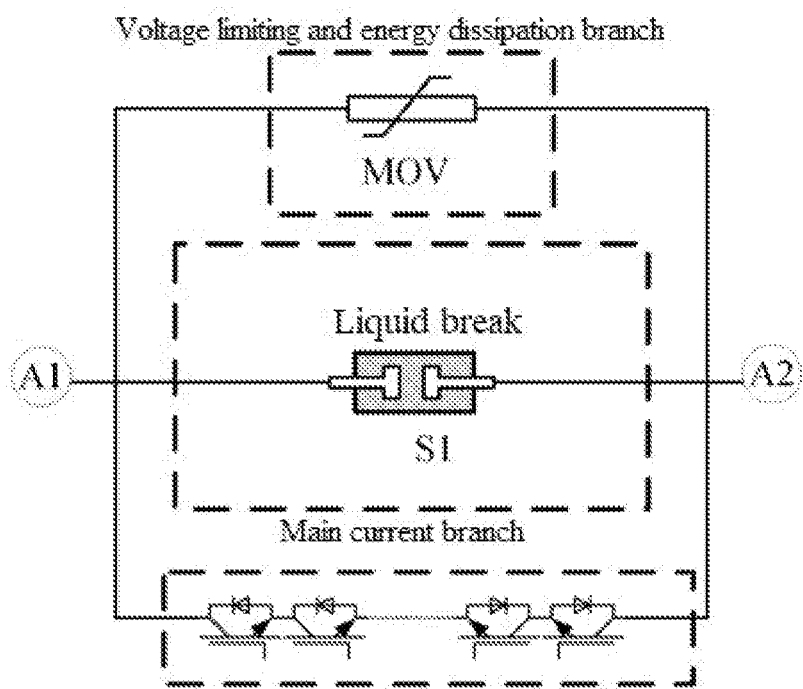
FIG. 4 is a schematic diagram of the liquid break-cascade two-way solid-state switch transfer branch type.

In one embodiment, FIG. 4 is a schematic diagram of the liquid break-cascade two-way solid-state switch transfer branch type. For this embodiment, see FIG. 4.

Figure 5:
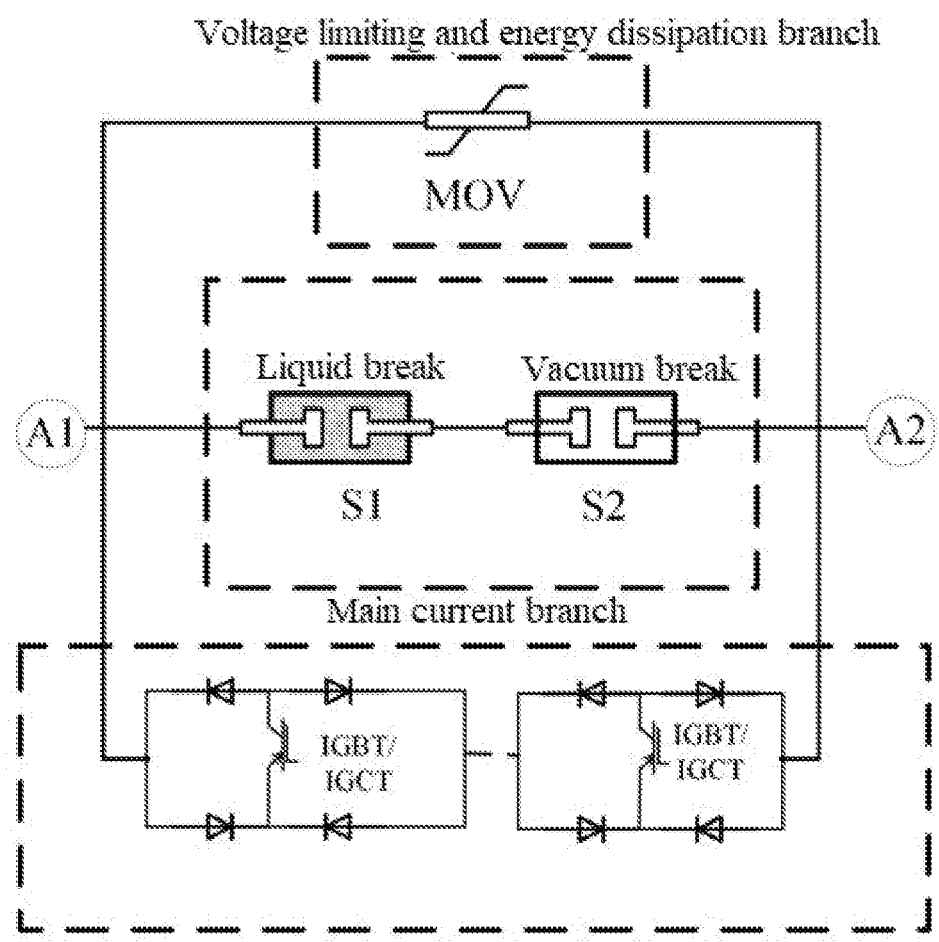
FIG. 5 is a schematic diagram of the liquid vacuum break-bridge two-way solid state switch transfer branch type.

In one embodiment, FIG. 5 is a schematic diagram of the liquid vacuum break-bridge two-way solid state switch transfer branch type. For this embodiment, see FIG. 5.

Figure 6:
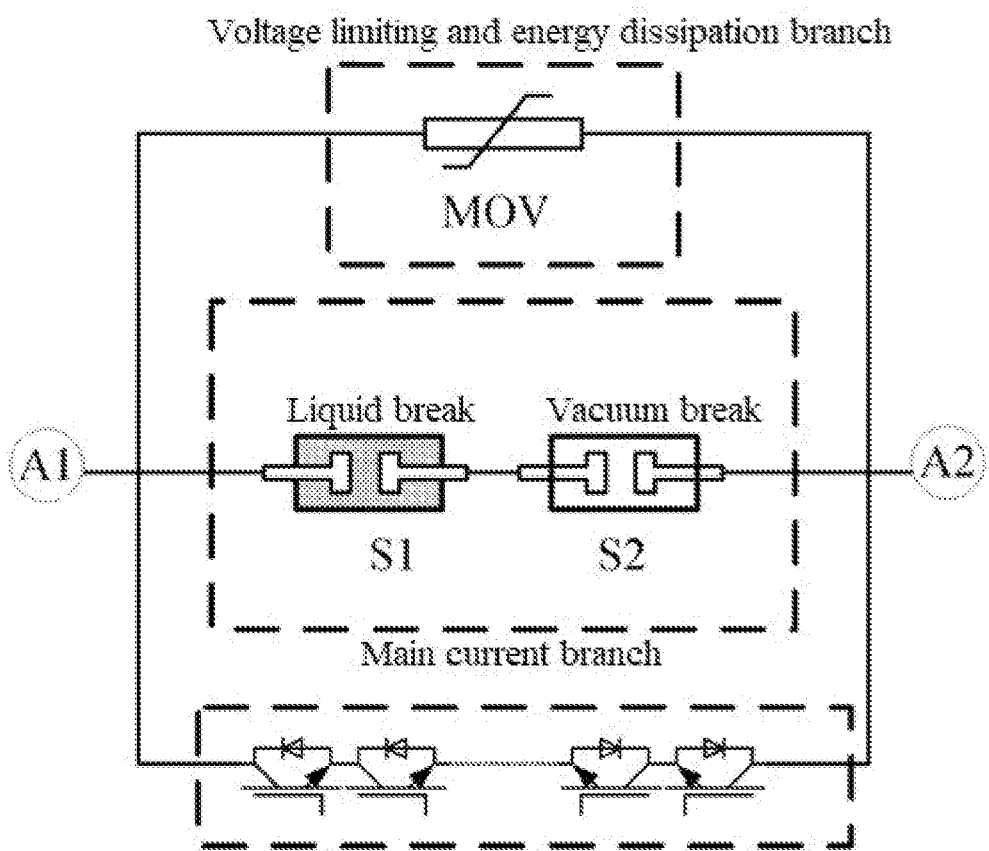
FIG. 6 is a schematic diagram of the liquid vacuum break-cascade two-way solid-state switch transfer branch type.

In one embodiment, FIG. 6 is a schematic diagram of the liquid vacuum break-cascade two-way solid-state switch transfer branch type. For this embodiment, see FIG. 6.

Figure 7:
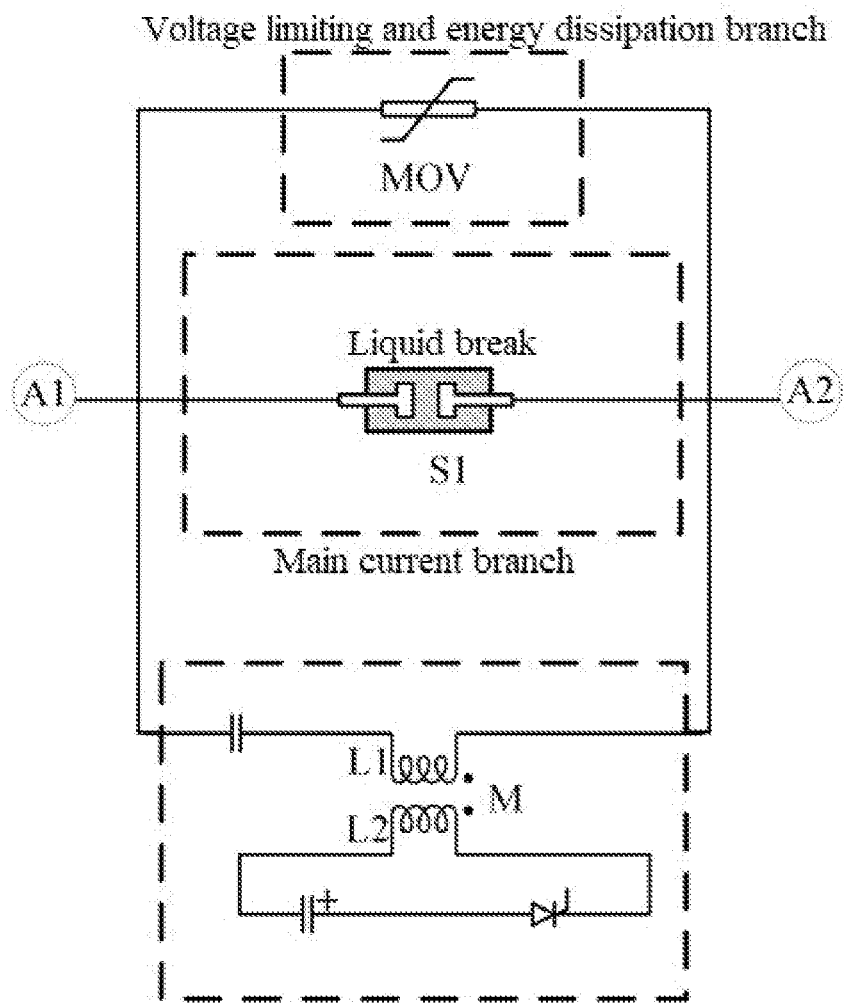
FIG. 7 is a schematic diagram of the liquid break-magnetic coupling current transfer branch type.

In one embodiment, FIG. 7 is a schematic diagram of the liquid break-magnetic coupling current transfer branch type. For this embodiment, see FIG. 7.

Figure 8:
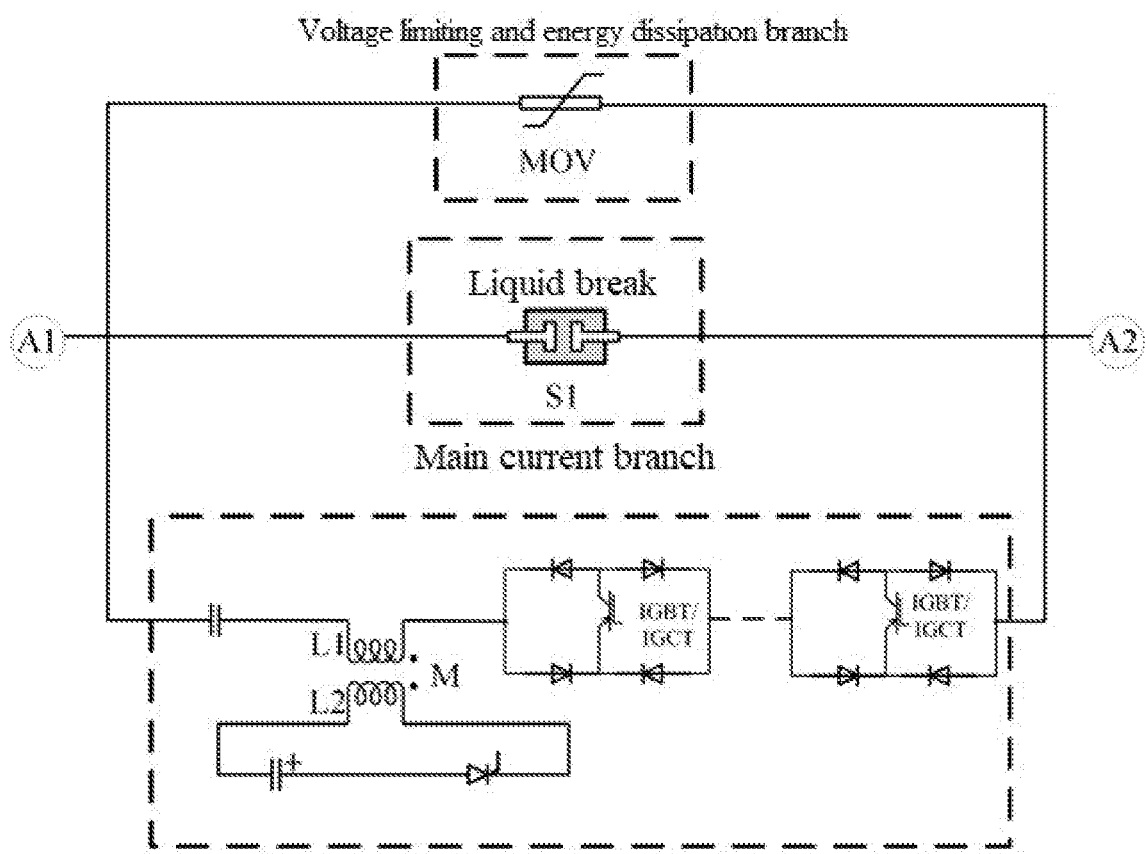
FIG. 8 is a schematic diagram of the liquid break-magnetic coupling-bridge two-way solid-state switch current transfer branch type.

In one embodiment, FIG. 8 is a schematic diagram of the liquid break-magnetic coupling-bridge two-way solid-state switch current transfer branch type. For this embodiment, see FIG. 8.

Figure 9:
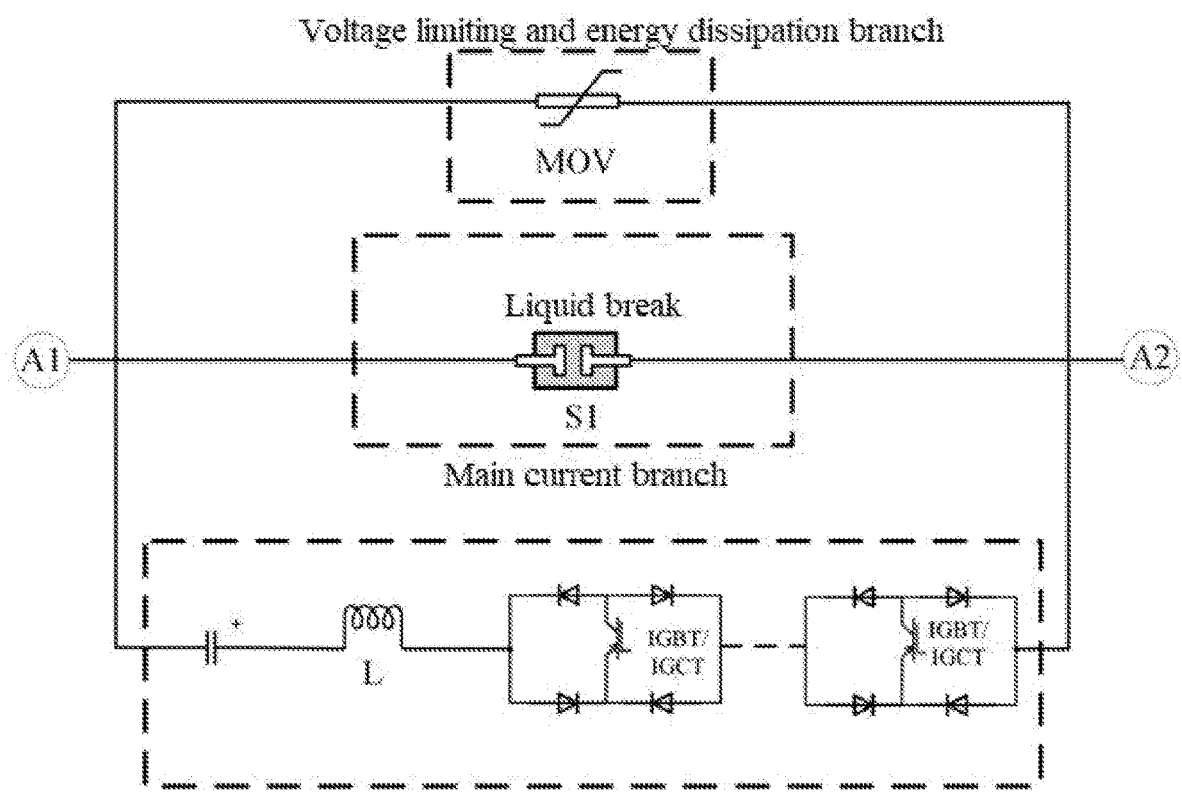
FIG. 9 is a schematic diagram of the liquid break-LC-bridge two-way solid-state switch current transfer branch type.

In one embodiment, FIG. 9 is a schematic diagram of liquid break-LC-bridge two-way solid-state switch current transfer branch type. For this embodiment, see FIG. 9.

In the present disclosure, a method of using the direct current breaker includes the following steps:

step 1: when current flows through the direct current breaker, the current flows through the main current branch, the transfer branch is not conducted, and a transfer capacitor in the transfer branch is pre-charged with a certain voltage;

step 2: when a short circuit fault occurs in the direct current breaker, a breaking instruction is sent to a fast switch of the liquid break, and moving and static contacts are open, and when the gap of the moving and static contacts reaches to a certain distance, a thyristor is controlled to be conducted, the pre-charged transfer capacitor discharges by a transfer inductor, and the current of the main current branch is completely transferred to the transfer branch, and the main current branch opens; and step 3: the transfer capacitor is charged reversely, and when the voltage reaches the conduction voltage of the energy dissipation branch, the energy dissipation branch is conducted, and the current is transferred completely to the energy dissipation branch, and finally the current drops to zero to realize the direct current breaking.

In one embodiment, FIGS. 2 (a) to 2 (f) give a schematic diagram of the structure of the direct current breaker when it works. The specific breaking process is as follows:

1. As shown in FIG. 2 (a), under normal working conditions, the rated current flows through the main current branch, and the transfer capacitor is pre-charged with a certain voltage;

2. As shown in FIG. 2 (b), when a short circuit fault occurs and the short-circuit current needs to be broken, a breaking instruction is sent to the quick switch Si at the liquid break, and the moving and static contacts are open, and when the gap of the moving and static contacts reaches a certain distance, the thyristor is controlled to be conducted, so that a VT1 thyristor group is conducted, the pre-charged capacitor discharges by the transfer inductor, and the current is transferred to the transfer branch;

3. As shown in FIG. 2 (c), the current of the main current branch is quickly and completely transferred to the transfer branch, and the current flowing through Si becomes zero, and the main current branch opens;

4. As shown in FIG. 2 (d), the polarity of capacitor voltage is reversed and increased as the power supply of the system continues to charge the capacitor reversely;

5. As shown in FIG. 2 (e), when the voltage reaches the conduction voltage of the voltage limiting and energy dissipation branch, the branch is conducted;

6. The current of the system is completely transferred to the voltage limiting and energy dissipation branch, and finally the current drops to zero and the whole breaking process is completed.

The above is a further detailed description of the present disclosure in connection with the specific preferred embodiments, and the specific embodiments of the present disclosure are not limited to the description. It should be noted that those skilled in the art may make several simple deductions or substitutions without departing from the principle consistent with the present disclosure, for instance, a one-way direct current breaker based on a one-way solid-state switch branch and a one-way oscillation branch can be deduced, and the deductions or substitutions shall fall within the protection scope consistent with the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A breaking method of a direct current breaker, comprising the following steps:

step 1: when current flows through the direct current breaker, making the current flow through a main current branch, and enabling a transfer branch to be not conducted, wherein a transfer capacitor in the transfer branch is pre-charged with a certain voltage;

step 2: when a short circuit fault occurs in the direct current breaker, sending a breaking instruction to a fast switch of a liquid break, and opening moving and static contacts, and when a gap of the moving and static contacts reaches a certain distance, controlling a thyristor to be conducted, making the pre-charged transfer capacitor discharge by a transfer inductor, and enabling the current of the main current branch to be completely transferred to the transfer branch to open the main current branch; and step 3: reversely charging the transfer capacitor, and when a voltage of the transfer capacitor reaches a conduction voltage of an energy dissipation branch, enabling the energy dissipation branch to be conducted, making the current transferred completely to the energy dissipation branch, and finally enabling the current to drop to zero to realize a direct current breaking, wherein the direct current breaker comprises:

a first connection terminal that is configured as an inlet wire of the direct current breaker, a second connection terminal that is configured as an outlet wire of the direct current breaker, the main current branch that is connected between the first connection terminal and the second connection terminal and includes the liquid break, the transfer branch that is connected between the first connection terminal and the second connection terminal and is connected in parallel with the main current branch, and the energy dissipation branch that is connected between the first connection terminal and the second connection terminal and is connected in parallel with the main current branch and the transfer branch.

2. The breaking method of the direct current breaker according to claim 1, wherein the main current branch includes the liquid break and a vacuum break.

3. The breaking method of the direct current breaker according to claim 1, wherein the transfer branch includes a solid-state switching transfer branch, a pre-charged LC transfer branch, a non-pre-charged LC transfer branch, a bridge LC transfer branch or a magnetically coupled transfer branch.

4. The breaking method of the direct current breaker according to claim 1, wherein the direct current breaker is a one-way direct current breaker or a two-way direct current breaker.

5. The breaking method of the direct current breaker according to claim 1, wherein the energy dissipation branch includes a metal oxide arrester, a line type metal oxide arrester, a gap-free line type metal oxide arrester, a fully insulated composite coat metal oxide arrester and a combination thereof.

6. The breaking method of the direct current breaker according to claim 1, wherein after the current is transferred to the transfer branch, a breaking voltage is set up through a capacitor or a solid-state switch, and the current is forcibly transferred to the energy dissipation branch to complete the breaking.

7. The breaking method of the direct current breaker according to claim 1, wherein the liquid of the liquid break includes distilled water, transformer oil, vegetable oil, liquid $C_5F_{10}O$, mineral oil or silicone oil.

* * * * *